United States Patent Office 3,790,680
Patented Feb. 5, 1974

3,790,680
CERTAIN EPOXIDIZED GERANYL ESTERS AND THEIR USE IN CONTROLLING INSECTS
Hwalin Lee, Palo Alto, Calif., assignor to Stauffer Chemical Company, New York, N.Y.
No Drawing. Original application May 19, 1969, Ser. No. 825,995, now Patent No. 3,584,015. Divided and this application Dec. 28, 1970, Ser. No. 102,157
Int. Cl. A01n 9/28
U.S. Cl. 424—278      11 Claims

ABSTRACT OF THE DISCLOSURE

Compounds having the formula

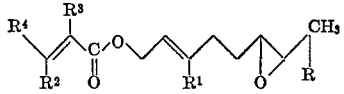

in which R and $R^1$ are independently methyl or ethyl; $R^2$, $R^3$, or $R^4$ are hydrogen or lower alkyl, and the use of these compounds in controlling insects.

---

This application is a divisional of copending application Ser. No. 825,995, filed May 19, 1969, now U.S. 3,584,015.

This invention relates to the use of certain novel chemical compounds in controlling insects, more particularly, the chemical compounds are certain epoxidized geranyl esters.

It has been found that there is a class of compounds which acts in a different manner on insects than presently used insecticides and exerts a disrupting influence upon the normal development of insects. Such compounds impede the normal metamorphosis of the normal pupation of pest insects and result in the formation of members of the treated species which develop abnormally and are non-viable or sterile. This ultimately leads, indirectly at least, to the destruction of a pest population.

The compounds of the present invention are believed to have the further advantages that they are non-toxic to warmblooded animals and highly effective in the control of insects at low dosages. It is also hoped that it will be more difficult for insects to develop resistance against these compounds.

One embodiment of the present invention is concerned with novel pesticidal compositions.

In another embodiment, the invention is concerned with the active pesticidal component of such compositions.

In still another embodiment, the invention is concerned with a process for controlling insects by hindering or impeding the metamorphosis and reproduction of the insects.

The compounds of the present invention that are useful in controlling insects are those having the formula

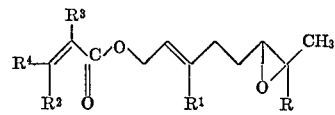

in which R and $R^1$ are independently methyl or ethyl; $R^2$, $R^3$, or $R^4$ are hydrogen or lower alkyl having 1 to 4 carbon atoms, preferably 1 to 2 carbon atoms; most preferably $R^2$, $R^3$, and $R^4$ are all lower alkyl having 1 to 2 carbon atoms.

As indicated heretofore, the above compounds are useful in impeding the metamorphosis and/or the reproduction of insects. The activity of the compounds is such that insects at any stage of their development can be effectively treated therewith; however, it is preferred to treat the larval, pupal, or egg stage, more preferably the pupal stage.

The compound having the formula

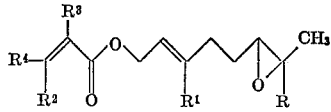

in which R, $R^1$, $R^2$, $R^3$, and $R^4$ are as defined can be prepared by the following reactions:

(1a)
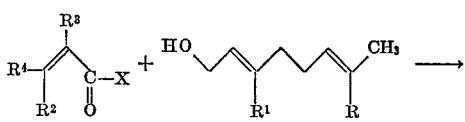

in which R, $R^1$, $R^2$, $R^3$, and $R^4$ are as defined, X is chlorine or bromine.

(1b)
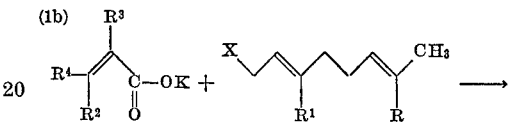

in which R, $R^1$, $R^2$, $R^3$, and $R^4$ are as defined, X is chlorine or bromine.

Preferably, reaction number 1a is carried out in a solvent such as tetrahydrofuran, with stirring by slowly adding an acid acceptor, such as triethylamine at room temperature, followed by heating at reflux to complete the reaction. The reaction product is recovered by conventional techniques such as stripping off the solvent in vacuum, extracting the residue with ether, washing the ether phase with 10% $Na_2CO_3$ solution, and then with water, followed by drying with anhydrous $MgSO_4$. Finally, the drying agent is filtered off and the ether is removed by vacuum stripping. Preferably, reaction number 1a is carried out using equal mole amounts of the reactant, although an excess of either reactant can be used.

Preferably, reaction number 1b is similar to that described for reaction number 1a with the exception that a suitable high boiling solvent is used and no other acid acceptor than the formed K salt is needed.

(2)
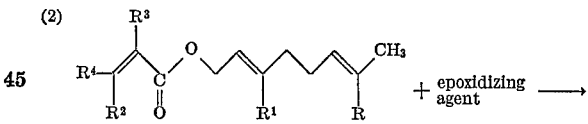

in which R, $R^1$, $R^2$, $R^3$, and $R^4$ are as defined.

Preferably, reaction number 2 is carried out in a solvent such as methylene chloride, preferably the epoxidizing agent is added slowly with stirring at a temperature sufficient to give a controlled reaction, such as about 5° C. to about 10° C. Preferably, reaction number 2 is carried out using about equal mole amounts of the reactants, or with a slight excess of the epoxidizing agent. The reaction product is recovered by conventional means.

The epoxidizing agents are well-known to those skilled in the art and include such materials as metachloroperbenzoic acid. Reference is made to Kirk-Othmer Encyclopedia of Chemical Technology, 2nd. edition (1965) vol. 8, pp. 238–244, for a discussion of various types of epoxidizing agents.

A method of preparation for the compounds

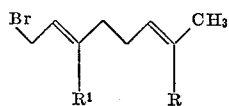

where either R or $R^1$ are ethyl, was published by W. S. Bowers, "Science," vol. 164, pages 323–325 (1969).

Preparation of the compounds of this invention is illustrated by the following specific examples.

EXAMPLE I

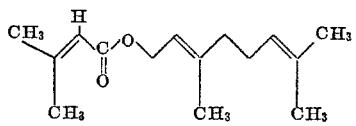

15.4 g. geraniol (0.1 mole) is dissolved in 150 ml. tetrahydrofuran. 15 g. β,β-dimethylacryloyl chloride is added. 13.0 g. trimethylamine, dissolved in 25 ml. tetrahydrofuran, is slowly dropped in.

An exothermic reaction occurs with a temperature rise to 55° C. The mixture is refluxed for one hour, then cooled. The triethylamine hydrochloride is filtered off and the tetrahydrofuran is evaporated under vacuum. The product is stirred with 100 ml. 10% $Na_2CO_3$ solution for one half hour, extracted with ether, washed with water, then dried over $MgSO_4$. The final product is filtered, and the ether is stripped under vacuum.

19.0 g. of an oil is obtained. The oil is vacuum distilled to yield a compound corresponding to the above formula, B.P. 79–81° (0.01 mm.). $n_D^{30}=1.4720$

EXAMPLE II

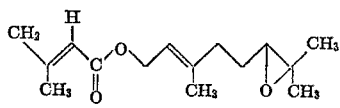

0.48 g. (0.002 mole) of the compound of Example I is dissolved in 10 ml. $CH_2Cl_2$. 0.002 mole m-perbenzoic acid, dissolved in 10 ml. $CH_2Cl_2$, is added. The temperature during the addition is kept between 5–10° C. The mixture is stirred at room temperature for one half hour, washed with 10% $NaHCO_3$ solution, dried over $MgSO_4$, filtered and stripped in vacuum. 0.4 g. of a compound corresponding to the above formula is obtained. The structure is confirmed by ir and nmr spectrum.

The following is a table of certain selected compounds that are preparable according to the procedures described hereto. Compound numbers are assigned to each compound and are used throughout the remainder of the specification.

TABLE I

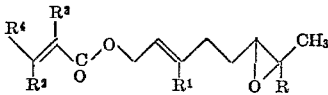

| Compound number | R | $R^1$ | $R^2$ | $R^3$ | $R^4$ |
| --- | --- | --- | --- | --- | --- |
| 1 | $CH_3$ | $CH_3$ | $CH_3$ | H | $CH_3$ |
| 2 | $CH_3$ | $CH_3$ | $CH_3$ | $CH_3$ | $CH_3$ |
| 3 | $CH_3$ | $CH_3$ | $CH_3$ | H | H |
| 4 | $C_2H_5$ | $C_2H_5$ | $CH_3$ | H | $CH_3$ |
| 5 | $C_2H_5$ | $C_2H_5$ | H | $CH_3$ | $CH_3$ |
| 6 | $CH_3$ | $CH_3$ | $C_2H_5$ | H | $C_2H_5$ |

INSECTICIDAL EVALUATION TEST

The degree of activity of a candidate compound to hinder or impede the metamorphosis of insects is measured by treating the penultimate larval stage of a representative insect with the compound and examining it after its last molt toward the adult form for retention of immature features.

Specifically, yellow mealworm, Tenebrio molitor, L., larvae are maintained at 28° C. and 40% humidity on a diet of bran flakes. Prepupae are collected from the culture and kept in separate containers. The pupae collected once daily, are 1–25 hours old at the time of treatment. By means of a syringe, suitable amounts of candidate compounds in 0.5 or 1.0 μl. of acetone are applied to the venter of Tenebrio molitor, L. pupae. Treated pupae are maintained at 28° C. and 40% humidity until the adults emerged (usually within 6–8 days). Emerged adults are graded as positive, negative, or dead. To be considered a positive response, the presence of typical pupal cuticle, urogomphi, gin trap, and abnormal wings, etc. are required. For each test, 2 groups of 20 pupae were used and the averaged results were reported.

The dose of a candidate compound per pupa that is needed to kill or give a positive response in the above insecticidal evaluation test for 10 of 20 pupae is determined. Table II shows these doses under the column $ED_{50}$.

TABLE II

| Compound Number | $ED_{50}$, μg./pupa |
| --- | --- |
| 1 | 40 |
| 2 | 7 |
| 3 | 10 |

The compounds of this invention are generally embodied into a form suitable for convenient application. For example, the compounds can be embodied into pesticidal compositions which are provided in the form of emulsions, suspensions, solutions, dusts and aerosol sprays. In general, such compositions will contain, in addition to the active compound, the adjuvants which are found normally in pesticide preparations. In these compositions, the active compounds of this invention can be employed as the sole pesticide component, or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc., upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition, for example, an emulsion, suspension, or aerosol spray. While the concentration of the active pesticide in the present compositions can vary within rather wide limits, ordinarily the pesticide compound will comprise not more than about 15.0% by weight of the composition. Preferably, however, the pesticide compositions of this invention will be in the form of solutions or suspensions containing about 0.1 to 1.0% by weight of the active pesticide compound.

What is claimed:

1. A method of controlling Tenebrio molitor comprising applying thereto at any stage of their development an effective amount of a compound of the formula

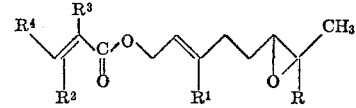

in which R and $R^1$ are independently methyl or ethyl; $R^2$, $R^3$, and $R^4$ are hydrogen, or lower alkyl having 1 to 4 carbon atoms sufficient to impede the metamorphosis of Tenebrio molitor.

2. The method of claim 1 in which R and $R^1$ are methyl; and $R^2$, $R^3$, and $R^4$ are lower alkyl having 1 to 4 carbon atoms.

3. The method of claim 1 in which R and $R^1$ are methyl; $R^2$, $R^3$, and $R^4$ are lower alkyl having 1 to 2 carbon atoms.

4. The method of claim 1 in which R, $R^1$, $R^2$, $R^3$, and $R^4$ are methyl.

5. The method of claim 1 in which R and $R^1$ are methyl, $R^2$ is methyl, and $R^3$ and $R^4$ are hydrogen.

6. The method of claim 1 in which R and $R^1$ are methyl, $R^2$ is methyl, $R^3$ is hydrogen, and $R^4$ is methyl.

7. The method of claim 1 in which R and $R^1$ are ethyl, and $R^2$, $R^3$, and $R^4$ are lower alkyl having 1 to 4 carbon atoms.

8. The method of claim 1 in which R and $R^1$ are ethyl, $R^2$, $R^3$, and $R^4$ are lower alkyl having 1 to 2 carbon atoms.

9. The method of claim 1 in which R and $R^1$ are ethyl, and $R^2$, $R^3$, and $R^4$ are methyl.

10. The method of claim 1 in which R and $R^1$ are ethyl, $R^2$ is methyl, and $R^3$ and $R^4$ are hydrogen.

11. The method of claim 1 in which R and $R^1$ are ethyl, $R^2$ is methyl, $R^3$ is hydrogen, and $R^4$ is methyl.

References Cited

UNITED STATES PATENTS

| | | | |
|---|---|---|---|
| 3,453,362 | 7/1969 | Cruickshank | 424—84 |
| 3,584,015 | 6/1971 | Lee et al. | 260—348 A |

OTHER REFERENCES

Borkovec, A., "Insect Chemosterilants," vol. VII (1966), pp. 61–63.

Bowers, Science, vol. 164, No. 3877 (Apr. 18, 1969), pp. 323–325.

ALBERT T. MEYERS, Primary Examiner

V. D. TURNER, Assistant Examiner

U.S. Cl. X.R.

424—DIG. 12